United States Patent
Lee et al.

(10) Patent No.: US 6,640,008 B1
(45) Date of Patent: Oct. 28, 2003

(54) ROTATION AND SCALE INVARIANT PATTERN MATCHING METHOD

(76) Inventors: Shih-Jong J. Lee, 15418 SE. 53rd Pl., Bellevue, WA (US) 98006; Seho Oh, 5229 107th St. SW., Mukilteo, WA (US) 98275; Ryan K Seghers, 14058 120th Ave. NE., Kirkland, WA (US) 98034

(*) Notice: Subject to any disclaimer, the term of this patent is extended or adjusted under 35 U.S.C. 154(b) by 0 days.

(21) Appl. No.: 09/895,150

(22) Filed: Jun. 29, 2001

(51) Int. Cl.⁷ ............... G06K 9/68; G06K 9/00; G06K 9/64; G06K 9/32
(52) U.S. Cl. ............ 382/218; 382/170; 382/278; 382/296; 382/298
(58) Field of Search ............... 382/168, 169, 382/170, 206, 209, 217, 218, 219, 220, 278, 295, 296, 298, 300, 301, 125, 150; 345/690, 692, 693, 648, 649, 660, 672; 348/583; 708/290, 422

(56) References Cited

U.S. PATENT DOCUMENTS

| | | | |
|---|---|---|---|
| 6,088,479 A | * | 7/2000 | Ikeshoji et al. ............ 382/170 |
| 6,185,318 B1 | * | 2/2001 | Jain et al. ............ 382/125 |
| 6,256,409 B1 | * | 7/2001 | Wang ............ 382/170 |
| 6,289,117 B1 | * | 9/2001 | Li ............ 382/150 |

FOREIGN PATENT DOCUMENTS

JP   09-102039   *   4/1997   ............ G06T/7/00

OTHER PUBLICATIONS

Khorsheed et al, "Spectral Features for Arabic Word Recognition", Jun. 9, 2000, IEEE Proceedings, ISBN: 0–7803–6293, vol. 6, pp. 3574–3577.*
Khorsheed et al, "Multi–Font Arabic Word Recognition Using Spectral Features", Sep. 7, 2000, IEEE Proceedings ISBN: 0–7695–0750, vol. 4, pp. 543–546.*

* cited by examiner

*Primary Examiner*—Mehrdad Dastouri

(57) ABSTRACT

A polar coordinate representation of a template image is projected onto the radius axis and rotation axis. Linear transformation of the radius projection provides multiple templates for rapid one dimensional scale search. Pattern matching of the angular projection onto the rotation axis facilitates rapid one dimensional pattern match for rotation variation. The invention overcomes the speed limitation of the normalized correlation template matching method when the pattern being searched is subject to rotation or size variation. A fast correlation method uses a weighted histogram sum to compute the correlation score.

6 Claims, 11 Drawing Sheets

ROTATION AND SCALE INVARIANT PATTERN MATCHING METHOD

CO-PENDING U.S PATENT APPLICATIONS

1. U.S. patent application Ser. No. 09/693,723, "Image Processing System with Enhanced Processing and Memory Management", by Shih-Jong J. Lee et. al., filed Oct. 20, 2000
2. U.S. patent application Ser. No. 09/693,378, "Image Processing Apparatus Using a Cascade of Poly-Point Operations", by Shih-Jong J. Lee, filed Oct. 20, 2000
3. U.S. patent application Ser. No. 09/692,948, "High Speed Image Processing Apparatus Using a Cascade of Elongated Filters Programmed in a Computer", by Shih-Jong J. Lee et. al., filed Oct. 20, 2000
4. U.S. patent application Ser. No. 09/703,018, "Automatic Referencing for Computer Vision Applications", by Shih-Jong J. Lee et. al., filed Oct. 31, 2000
5. U.S. patent application Ser. No. 09/702,629, "Run-Length Based Image Processing Programmed in a Computer", by Shih-Jong J. Lee, filed Oct. 31, 2000
6. U.S. patent application Ser. No. 09/738,846 entitled, "Structure-guided Image Processing and Image Feature Enhancement" by Shih-Jong J. Lee, filed Dec. 15, 2000.
7. U.S. patent application Ser. No. 09/739,084 entitled, "Structure Guided Image Measurement Method", by Shih-Jong J. Lee et. al., filed Dec. 14, 2000.
8. U.S. Patent Application entitled, "Automatic Detection of Alignment or Registration Marks", by Shih-Jong J. Lee et. al., filed Mar. 23, 2001
9. U.S. patent application Ser. No. 09/834,817 entitled, "Automatic Template Generation and Searching Method" by Seho Oh et. al., filed Apr. 12, 2001

References:
1. Ballard D H and Brown C M, "Computer Vision", ISBN 0-13-165316-4 Prentice-Hall Inc. 1982, chapter 3, pp 67–69.
2. Lee, J S J, Haralick, R M and Shapiro, L G, "Morphologic Edge Detection," IEEE Trans. Robotics and Automation RA3(2):142–56, 1987.
3. Silver, B, "Geometric Pattern Matching for General-Purpose Inspection in Industrial Machine Vision", Intelligent Vision '99 Conference—Jun. 28–29, 1999.

TECHNICAL FIELD

This invention is related to image processing and pattern recognition and more particularly to improving template matching to be largely independent of size and rotation variation.

1. Background of the Invention

Pattern matching is a simple yet powerful machine vision tool. The normalized correlation method has been widely used in many machine vision applications. The match score of normalized correlation is largely independent of linear variations in object shading caused by reflectivity or illumination variations. However, the normalized correlation method does not work well when the pattern being searched is subject to rotation or size variations. The match score could drop significantly when only a few degrees of rotation or a small percentage of size change occurs.

2. Prior Art

Pattern matching is a simple yet powerful machine vision tool. A type of pattern matching, normalized correlation, (Ballard D H and Brown C M, "Computer Vision", Prentice-Hall Inc. 1982 pp. 68–70) has been widely used in many machine vision applications. The match score from normalized correlation is largely independent of linear variations in object shading caused by reflectivity or illumination variations. However, the normalized correlation method does not work well when the pattern being searched is subject to rotation or size variations. The match score could drop significantly even for only a few degrees of rotation or a few percent size difference from the template.

One prior approach to resolving this sensitivity is to rotate and scale the pattern template, making multiple templates and then try all possible scale and rotation combinations. However, this is very computationally expensive and has not been widely used. Another prior art approach is to use a geometric pattern matching method such as PatMax introduced by Cognex (Silver, B, "Geometric Pattern Matching for General-Purpose Inspection in Industrial Machine Vision", Intelligent Vision '99 Conference—Jun. 28–29, 1999). This approach uses geometric information in place of pixel grid-based normalized correlation. For example, it interprets a square as four line segments and a football as two arcs. It extracts key geometric features within an object image using a method such as boundary encoding and from the extracted features measures characteristics such as shape, dimensions, angle, arcs, and shading. It then adjusts the spatial relationships in the pattern template (by scaling and rotation) to match the key features of the new input image. However, this prior art approach requires high edge contrast and low noise between patterns and background to reliably extract the key geometric features for matching. This prior art approach fails when edges of the key features are noisy or indefinite. This is the inherent problem when using a geometric approach in place of a pixel grid based approach.

OBJECTS AND ADVANTAGES

It is an object of the invention to provide a fast pattern search method that can accurately locate patterns of interest in instances where they vary in size or orientation, when their appearance is degraded, and even when they are partially hidden from view.

It is an object of the invention to achieve the advantages of rotation and scale invariance while using the pixel grid based approach on low contrast and noisy images.

It is an object of the invention to use a multi-resolution coarse-to-fine search approach for fast template searching.

It is an object of the invention to perform fast correlation using a weighted histogram sum to compute the correlation score. When the number of gray scale values is limited, this can decrease the computation time required. This technique is particularly applicable for large pattern templates.

It is an object of the invention to implement the fast search method in a general purpose computer platform without any special hardware. This reduces cost and system complexity.

SUMMARY OF THE INVENTION

This invention generates a polar coordinate representation of the pattern template image or a feature enhanced template image that allows for fast search of scale along the radial axis and rotation along the angular axis. Fast search can be achieved by projecting image intensities into the radial axis and transforming them to create multiple scale templates for scale search and projecting image intensities into angular axis for rotation angle search by one dimensional pattern matching. Furthermore, a multi-resolution coarse to fine search approach can be used to further increase the search speed. In this approach, wide search ranges are applied only using the lower resolution images or profiles and a fine-tuning search is applied using higher resolution images or profiles. This efficiently achieves wide search range and fine search resolution.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

This invention provides a fast pattern search method that can accurately locate patterns of interest in instances where they vary in size or orientation, when their appearance is degraded, and even when they are partially hidden from view. It retains the advantage of the pixel grid based normalized correlation approach on low contrast and noisy images yet it achieves the advantage of rotation and scale invariance. The invention generates a polar coordinate representation of the pattern template image (or a feature enhanced template image) that allows for fast linear search of scale along the radial axis and rotation along the angular axis. Fast search can be achieved by projecting image intensities into a radial axis and creating scaled copies thereof for one dimensional scale search and projecting image intensities into an angular axis for one dimensional rotation angle search. A multi-resolution coarse to fine search approach can be used to further increase the search speed. In this approach, wide search ranges are applied only using lower resolution images or profiles and a fine-tuning search is accomplished using higher resolution images or profiles. This efficiently achieves both a wide search range and fine search resolution. A further objective of this invention is to allow the software implementation of the fast search method in a general computer platform without special hardware to reduce cost and system complexity.

I. Application Scenarios

Figure 1:
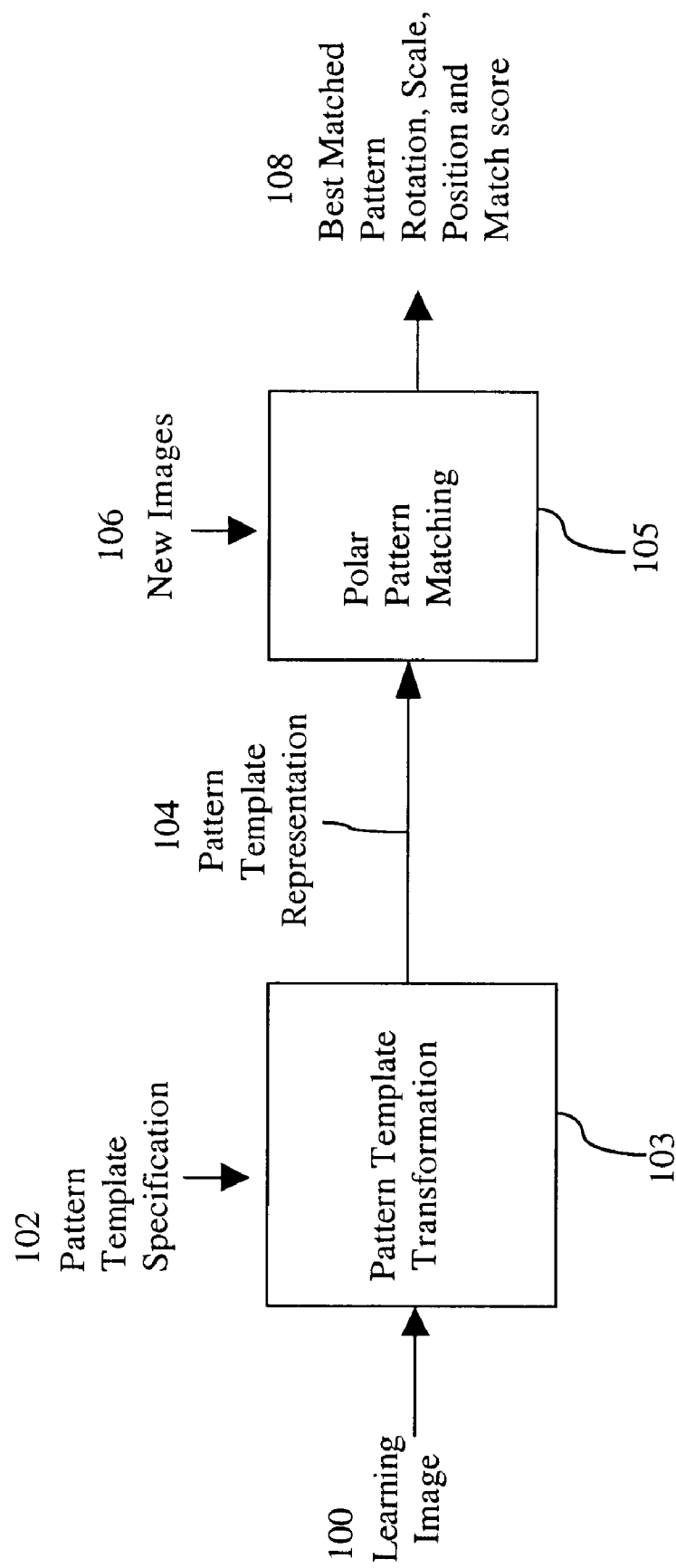
FIG. 1 shows the processing flow of a pattern template matching application of this invention.

FIG. 1 shows the processing flow of a pattern matching application scenario of the invention. At least one learning image 100 is used for pattern template transformation. The pattern template specification 102 specifies the location and shape of the pattern template region within the learning image. The pattern template transformation step 103 produces a polar coordinate pattern template representation 104. The transformed pattern template representation 104 is used for polar pattern matching 105 of new images 106. The polar pattern matching result 108 includes a rotation, scale and position of the best match pattern and its match score as well as other information such as intensity gain and offset.

Figure 2:
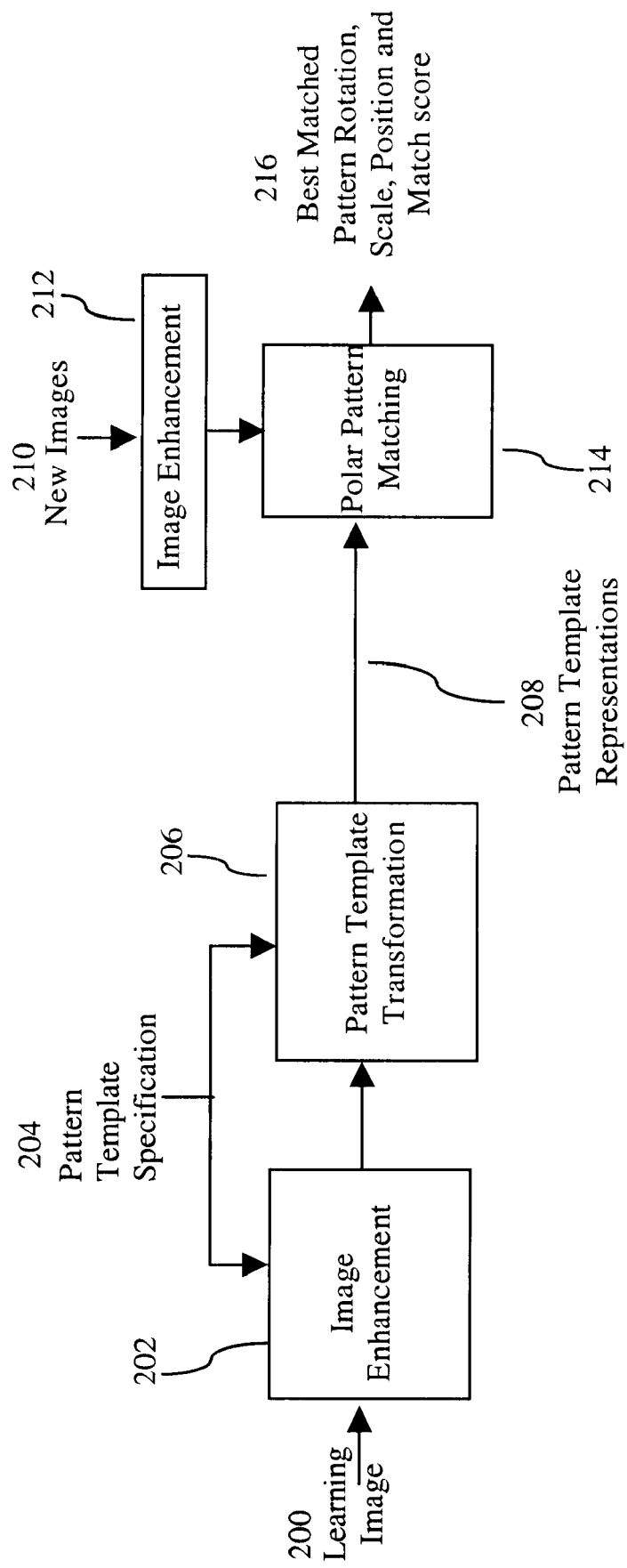
FIG. 2 shows the processing flow of an alternative embodiment pattern template search application of this invention.
Figure 3:
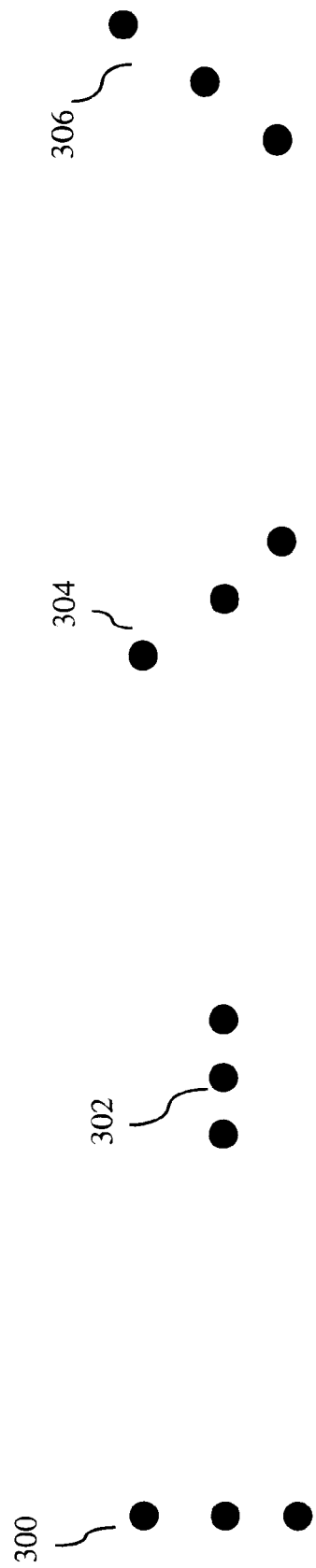
FIG. 3A shows a three point directional elongated filter having vertical alignment.
FIG. 3B shows a three point directional elongated filter having horizontal alignment.
FIG. 3C shows a three point directional elongated filter having 45 degree angle alignment.
FIG. 3D shows a three point directional elongated filter having 135 degree angle alignment.

FIG. 2 shows another embodiment of the pattern matching application scenario of this invention. The pattern template specification 204 specifies the location and shape of the pattern template region within the learning image. A learning image 200 is enhanced 202 and transformed 206 to produce a pattern template representation 208 which may be a polar coordinate representation. In this alternative embodiment, image enhancement is performed on both the learning image 200 and the new images 210 before the pattern template transformation 206 and the polar pattern matching steps 214. The image enhancement step 202, 212 enhances pattern features of interest to improve the accuracy of the matching. A matching result 216 may include the rotation, scale, position and match score for the polar pattern match. Those skilled in the art should recognize that image enhancement can be applied to the polar pattern template representation or one dimensional profiles of the representation to benefit the subsequent matching.

II. Image Enhancement

Image enhancement operations are applied to the learning image and new images or their representations. The image enhancement operations enhance the pattern template discrimination signal to noise appropriately to increase the accuracy of the pattern search. In one embodiment of the invention, morphology filtering is used to perform the image enhancement processing as disclosed in U.S. patent application Ser. No. 09/738,846 entitled, "Structure-guided Image Processing and Image Feature Enhancement" by Shih-Jong J. Lee, filed Dec. 15, 2000 which is incorporated in its entirety herein. Grayscale morphological filters can enhance specific features of the image. Typical morphological filters include opening residue that enhances bright lines, closing residue that enhances dark lines, erosion residue that enhances bright edges and dilation residue that enhances dark edges. Morphological processing is nonlinear and therefore may not introduce phase shift and/or blurry effect that often accompany linear filters. Image structure can be highlighted using directional elongated morphological filters of different directions. In one embodiment of the invention, three point directional elongated filters 300, 302, 304, 306 of four directions are used. The configuration of the four directions is shown in FIGS. 3A, 3B, 3C, and 3D wherein each black dot represents a filter element (a point in the structuring element) arranged in a two dimensional matrix.

In one embodiment of the invention, the results of different directional elongated filters can be combined by maximum operations as follows:

Max (dilation residue by three point directional elongated filters)
Max (erosion residue by three point directional elongated filters)
Max (closing residue by three point directional elongated filters)
Max (opening residue by three point directional elongated filters)

Selection of an image enhancement operation alternative can be automatically determined. The above four image enhancement operations and a no enhancement option can be used in an automatic selection process. The process selects one out of the five possible image enhancement options for a given pattern template specification. The method in U.S. patent application Ser. No. 09/834,817 entitled, "Automatic Template Generation and Searching Method" by Seho Oh et. al., filed Apr. 12, 2001 which is incorporated in its entirety herein can be used for automatic selection. The selection area of the template can be pre-defined or determined by learning. The best template region can be determined as the sub-image that yields the maximum discrimination power within the selection area among all presented image pre-processing methods.

Those skilled in the art should recognize that other directional elongated filters or morphological filters of other shapes such as circular or rectangular can be used. Furthermore, shift invariant filters can be used to preprocess the image. Linear filters can also be used. For example, a band pass linear filter can be used to enhance specific features. Convolution with a special kernel can achieve the effect of de-blurring, or removing positional vibration, un-distortion, etc.

III. Pattern Template Transformation

Figure 4:
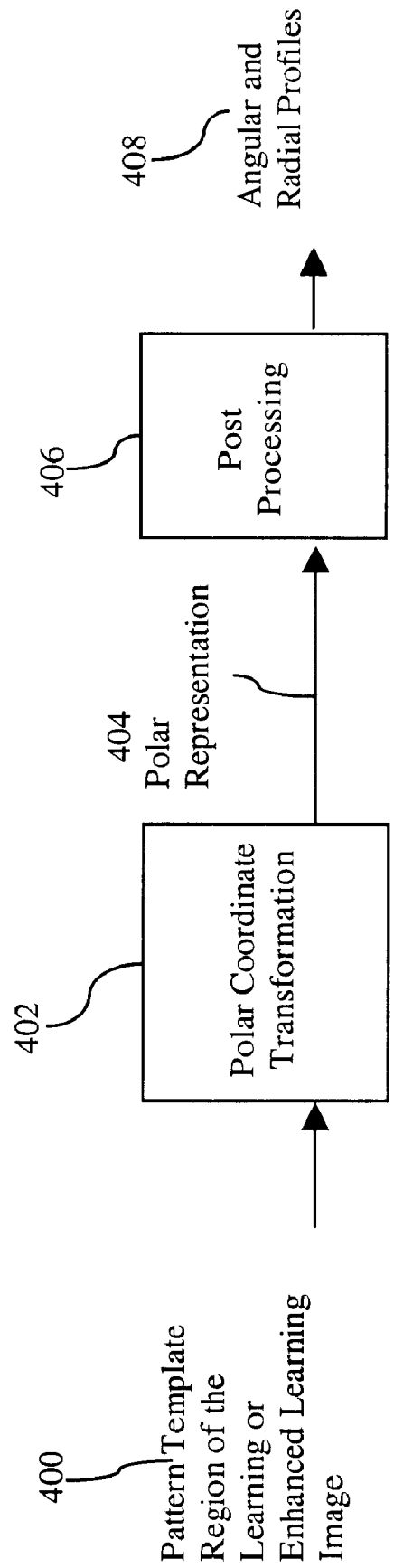
FIG. 4 shows the processing flow of the pattern template transformation method.

The processing flow of the pattern template transformation method of the invention is shown in FIG. 4. A pattern template region of the learning or enhanced learning image 400 is received and is transformed to polar coordinate form 402 to produce a polar representation 404. The polar representation is post-processed 406 to produce angular and radial profiles 408 that are used for fast pattern matching.

III.1 Polar Coordinate Transformation

The polar coordinate transformation step 402 converts a circular region enclosing the pattern template into polar coordinate format. Since a circle is isotropic, the starting direction for the pattern template can be arbitrarily selected. In a preferred embodiment of the invention, the horizontal direction (x-axis) is chosen as the starting direction.

In the polar transform, pixels near the center of the transform region are oversampled, meaning they appear multiple times in the output image. When one-dimensional projection profiles of the output image are created, the oversampled pixels are counted multiple times, and therefore are weighted higher than the other pixels. In one embodiment of the invention, this oversampling effect is compensated. To compensate for this undesirable affect, pixel vales in the output can be scaled using (multiplied by) their radius or the square root of their radius. This way the intensity of the pixels in the output is scaled to compensate for the oversampling. To manage the range of the output values, a scale factor can be used. For example, if the output values would exceed the range covered by a 16 bit unsigned short integer, you could use a scale factor to reduce the range needed for the output image.

The conversion steps are:

1. Select the center point (x_c, y_c)
2. Select the radius r of the circular region
3. Select a radial sampling factor R
4. Select a radial scale factor (radialScale) to compensate for oversampling (optional).
5. Select an angular sampling factor A
6. Determine the width of the converted region as w=2π*r*A
7. Determine the length of the converted region as L=r*R
8. Determine the value of each point of the converted region by the sequence specified in the following pseudo code:

```
For (i = 0; i < w; i++)
{
    line_direction = i/r*A;
    For (j = 0; j < L; j++)
    {
        Radius = j/R;
        Determine the pixel P that is closest to the point
            that is at a Radius distance from (x_c, y_c)
            along line_direction;
        Set the converted region value at index i and j as:
            PC[i] [j] = value of P * radius * radialScale;
    }
}
```

FIG. 5 shows an illustrative example of the polar coordinate transformation. In this example, a square pattern 501 that is contained within a circular region 500 having radius 503 is transformed from its center 507. The resulting polar coordinate representation of the square pattern when the radial sampling factor and the angular sampling factor are both set to a reference value of 1 is shown in FIG. 5B. FIGS. 5B, 5C, and 5D show the cases where the horizontal axis is progressively increasing radial sampling distance and the descending vertical axis is progressively increasing angular sampling distance. The resulting polar coordinate representation of the square pattern when the radial sampling factor and the angular sampling factor are both set to 0.5 of the reference value is shown in FIG. 5C. The resulting polar coordinate representation of the square pattern when the radial sampling factor and the angular sampling factor are both set to 0.25 of the reference value is shown in FIG. 5D. The radial sampling factor and the angular sampling factor control the resolution of the conversion. Adjusting these factors is useful for a coarse-to-fine resolution pattern matching approach.

When doing an image pattern search with the same pattern template, it is typical to perform the polar transformation many times from different regions of the input image. Typically these transformations may have the same parameters, such as the same radius, radial sampling factor, and angular sampling factor. When doing this transformation repeatedly with these parameters the same, the processing can be optimized by creating a lookup table that maps pixel locations in the polar image back to pixel locations in the non-polar input image. The lookup table process is described in co-pending U.S. patent application Ser. No. 09/693,723, "Image Processing System with Enhanced Processing and Memory Management", by Shih-Jong J. Lee et. al., filed Oct. 20, 2000 which is incorporated in its entirety herein. The transform process using a lookup table is:

For each pixel in the output polar image

```
{
    Determine the output pixel's corresponding input pixel using
        a lookup table
    Copy the input pixel value into the output location, and
        scale the value by the radius and radialScale factor
}
```

In another embodiment the polar coordinate transform is done without compensation for oversampling and the processing is done instead with a weighting factor. In one embodiment, the weighting value is proportional to the radius value. The weighting factor can also be defined to highlight the important features. For example, it can be a combination of radius and edge intensity. In this way, the weighting operation becomes part of the radial post processing, the angular post processing, the matching function, the average calculation, and the standard deviation calculation. Furthermore, the weighting factors can be determined by automatic referencing learning as described in co-pending U.S. patent application Ser. No. 09/703,018, "Automatic Referencing for Computer Vision Applications", by Shih-Jong J. Lee et. al., filed Oct. 31, 2000 which is incorporated in its entirety herein.

III.2 Post Processing

The post-processing step performs data reduction to generate templates for efficient matching. In one embodiment of the invention, this step performs one-dimensional projections from the polar representation. The projections are separately performed along angular and radial directions.

III.2.1 Angular Post Processing

Figure 5A:
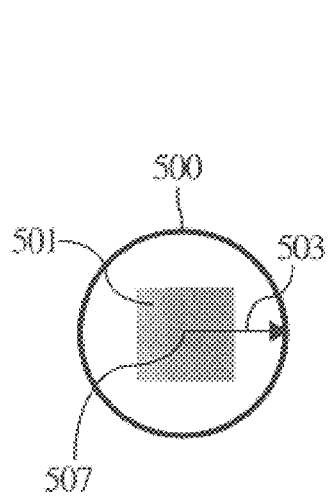
FIG. 5A shows a square pattern template.
Figure 5B:
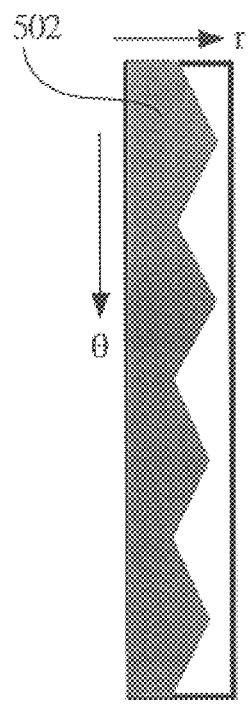
FIG. 5B shows the FIG. 5A pattern with polar coordinate representation when A=1 and R=1.
Figure 5C:
FIG. 5C shows the FIG. 5A polar coordinate representation when A=0.5 and R=0.5
Figure 5D:
FIG. 5D shows the FIG. 5A polar coordinate representation when A=0.25 and R=0.25.
Figure 6A:
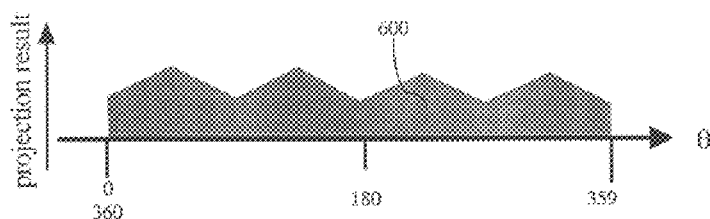
FIG. 6A shows a one-dimensional angular profile for FIG. 5B.
Figure 6B:
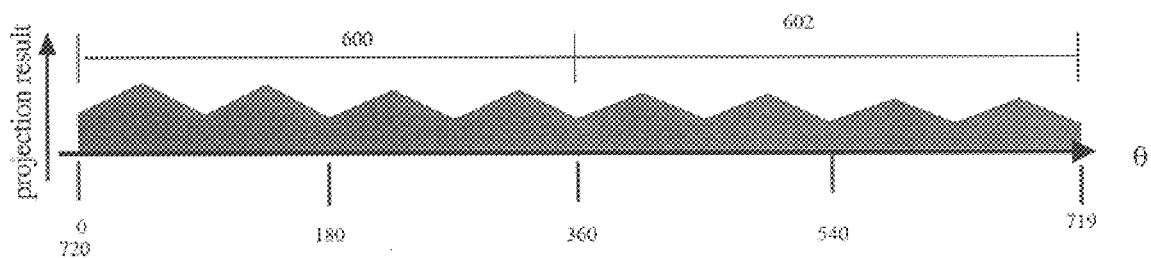
FIG. 6B shows an appended angular profile to the FIG. 6A profile.

To provide data for efficient angular search, the polar representation is projected along the radial direction. The result is a one-dimensional profile indexed by different angles. The projection value for a given angle is the sum of the grayscale intensity values of all pixels of this angle (pixels along the radial direction at this angle) in the polar representation. Assuming all pixels within the shaded region of FIG. 5B have the same grayscale value (which is shown in the transformed square 501 in FIG. 5A), then the radial projection result of FIG. 5B is illustrated in FIG. 6A, 600. In addition, to facilitate efficient rotation search (that requires shift and match of the angular profiles), a copy of the profile 600 is appended to the end of the pattern template profile 602 as shown in FIG. 6B. This allows the shifting of the pattern template profile by simply changing the starting angle value within the range of 0 to 360 degrees and read a consecutive segment of profile values during the pattern matching process. Only a partial profile is required to be appended to the end of the pattern template profile if the rotation search range is smaller than 360 degrees.

III.2.2 Radial Post Processing

Figure 7A:
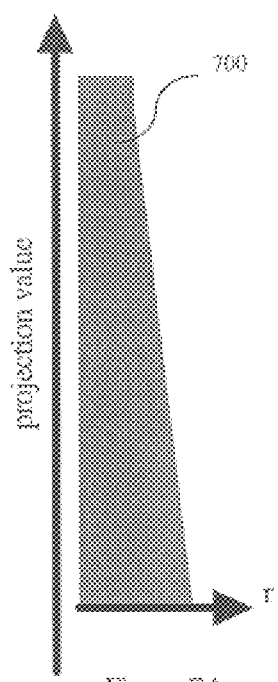
FIG. 7A shows a one-dimensional radial profile for the FIG. 5B polar coordinate representation of a square pattern
Figure 7B:
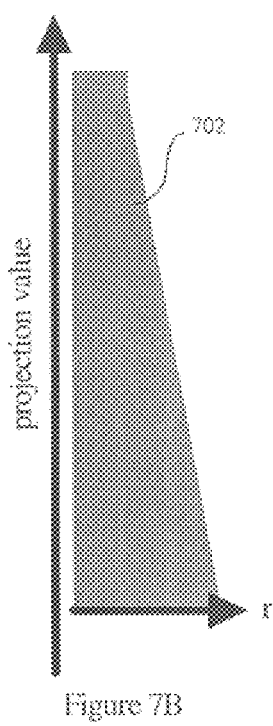
FIG. 7B shows a stretched profile of FIG. 7A.
Figure 7C:
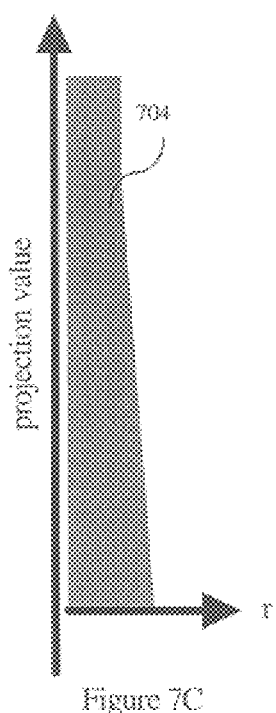
FIG. 7C shows a compressed profile of FIG. 7A.

To provide data for efficient size search, the polar representation is projected along the angular direction. This results in a one-dimensional profile indexed by radius. The projection value for a given radius is generated by summing the grayscale intensity of all pixels of this radius along the angular direction. For this example, if all pixels within the shaded region of FIG. 5B have the same grayscale value, then the projection value of FIG. 5B can be illustrated in FIG. 7A. In addition, to facilitate efficient size search that requires a match of the radial profile of different scales, multiple profiles corresponding to different scale of the object in FIG. 5A are generated by stretching (FIG. 7B) or compressing (FIG. 7C) the pattern template profile yet fix the same overall length of the profile. The overall length of the profile is fixed by the circle radius 500 of FIG. 5A. The overall length of the profile should be the same between the pattern template and the patterns to be matched. Pattern template profiles corresponding to different scales within the desired search range can be stored ahead of time for efficient pattern matching at different scale. In one embodiment of this invention, one-dimensional linear interpolation is used for profile stretching and compression. Other methods of stretching and compression can also be used.

IV. Polar Pattern Matching

Figure 8:
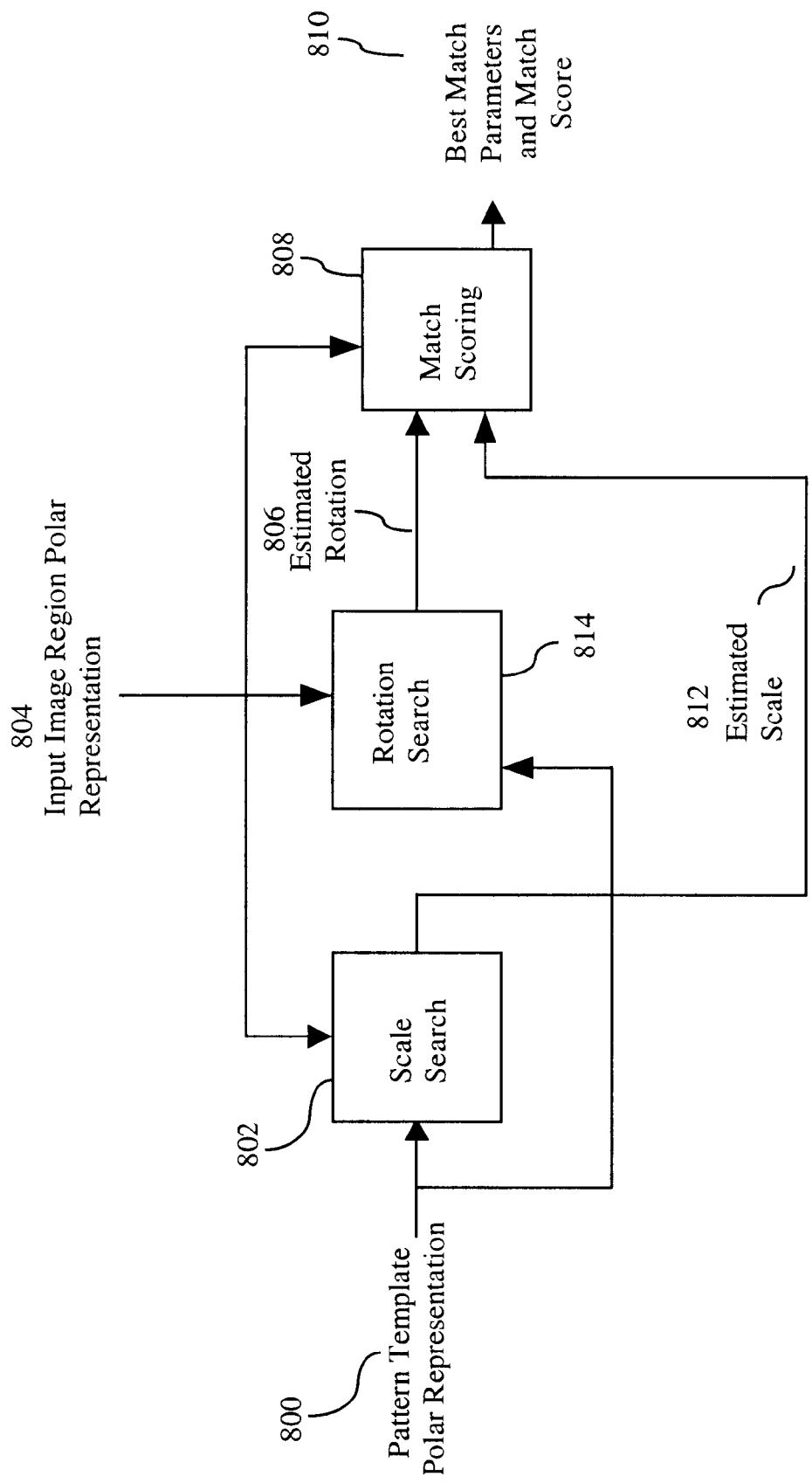
FIG. 8 shows the processing steps of the polar pattern matching method.

The processing steps of the polar pattern matching method are shown in FIG. 8. In one embodiment of the invention, the polar pattern matching determines the scale and rotation that yield the best match between a polar representation of an image region and a given pattern template polar representation. It also provides the best match score. Other information such as intensity gain and offset can be provided as well. To improve search efficiency, the scale and rotation search ranges can be provided to limit the scope of the search. The pattern template polar representation 800 and the input image region polar representation 804 are received. A scale search step 802 estimates the scale 812 between the pattern template and the input image region. A rotation search step 814 estimates the rotation difference 806 between the pattern template and the input image region. A match scoring step 808 outputs the best match parameters 810 that may include scale factor, rotation difference, intensity gain and offset as well as match score. Those skilled in the art should recognize that the order between scale search and rotation search could be reversed to yield the same result.

IV.1 Scale Search

In one embodiment of the invention, the scale search is performed using one-dimensional radial profiles (such as 700, 702, 704) generated from radial post processing step described in section III.2.2. One-dimensional profile matching is performed between the radial profile of the input region and pattern template profiles of different scales. It finds the scale within the search range that maximizes a matching function. That is, Find $s^*$ within the search range that maximizes Matching ($R\_profile\_input$, $R\_profile\_template\_s$).

The value $s^*$ is the estimated scale factor between the input image region and the pattern template.

In one embodiment of the invention, a cross correlation method is used as the matching function. This is, Matching ($R\_profile\_input$, $R\_profile\_template\_s$)=

$$\sum_{i=1}^{L} R\_profile\_input(i) * R\_profile\_template\_s(i)$$

Note that one-dimensional image processing can be applied to the radial profiles to enhance features, remove noise or background intensity or other signal to noise increasing purposes before the matching function is applied. One-dimensional image processing includes linear filters such as low-pass, high-pass or band-pass filters or morphological filters such as dilation, erosion, opening, closing or their residues as well as other linear and non-linear operations. Those skilled in the art should recognize that other matching functions such as distance metric, $\chi^2$ test, or normalized correlation could also be used.

IV.2 Rotation Search

In one embodiment of the invention, the rotation search is performed using one-dimensional angular profiles generated from an angular post-processing step described in section III.2.1. One-dimensional profile matching is performed between the angular profile of the input region and the pattern template profile subject to different angle shifts. It finds the angle offset within the rotation search range that maximizes a matching function. That is, Find $a^*$ within the search range that maximizes Matching ($A\_profile\_input$, $A\_profile\_template\_a$).

The value $a^*$ is the estimated rotation difference between the input image region and the pattern template.

In one embodiment of the invention, a cross correlation method is used as the matching function. That is, Matching ($A\_profile\_input$, $A\_profile\_template\_a$)=

$$\sum_{i=1}^{L} A\_profile\_input(i) * A\_profile\_template\_s(a)$$

Note that one-dimensional image processing can be applied to the radial profiles to enhance features, remove noise or normalize background intensity before the matching function is applied. One-dimensional image processing includes linear filtering such as low-pass, high-pass or band-pass filters or morphological processing such as dilation, erosion, opening, closing or their residues as well as other linear and non-linear operations. Those skilled in the art should recognize that other matching functions such as distance metric, $\chi^2$ test, or normalized correlation could also be used.

IV.3 Match Scoring

Figure 9:
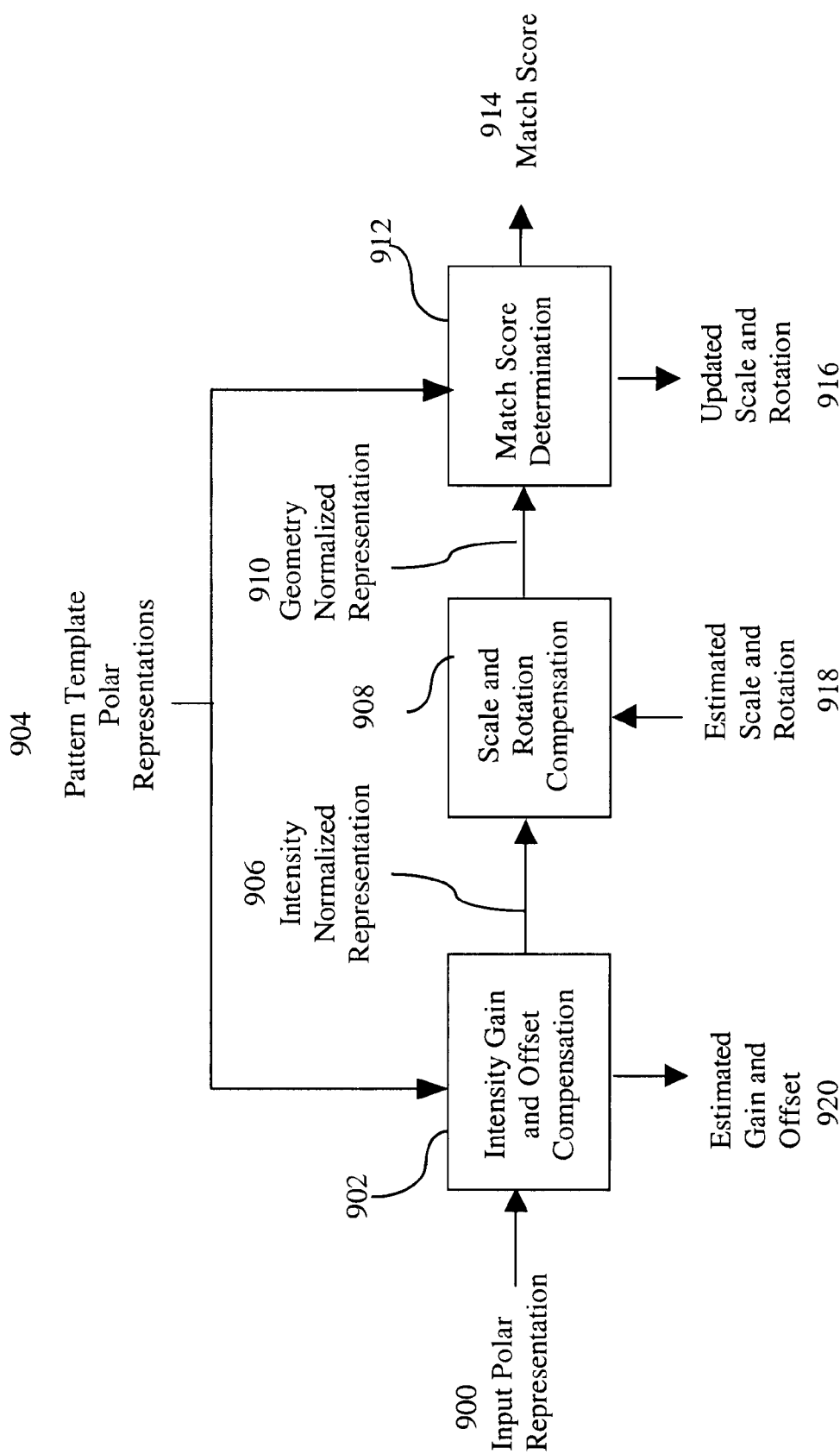
FIG. 9 shows the processing flow of the basic match scoring method.

FIG. 9 shows the processing flow of the basic match scoring method. The match-scoring step determines a numerical match score. It can also include the fine-tuning of the matching parameters (scale and rotation) as well as the determination of intensity gain and offset difference between the template and the input polar representation. The input polar representation 900 and the pattern template polar representation 904 are received. In the intensity gain and offset compensation step 902, the grayscale intensities of the input polar representation 900 and the pattern template polar representations 904 are compared and gain and offset adjustment values are determined 920. The input polar representation is normalized to compensate for the intensity gain and offset difference. This yields an intensity-normalized representation 906. A scale and rotation compensation step 908 performs scale and rotation normalization using the initially estimated scale and rotation values 918. The intensity and geometric normalized input polar representation 910 and the pattern template polar representations 904 are used to determine a match score 914 by the match score determination step 912. For applications, where the absolute grayscale intensities are important for matching, the intensity gain and offset compensation step 902 can be skipped.

Those skilled in the art should recognize that two-dimensional image processing can be applied to the polar representation to enhance features, remove noise or background intensity before the matching function is applied. Two-dimensional image processing includes linear filtering such as low-pass, high-pass or band-pass filters or morphological processing such as dilation, erosion, opening, closing or their residues as well as other linear and non-linear operations.

IV.3.1 Intensity Gain and Offset Compensation

In this step, the grayscale intensities of the input polar representation and the pattern template polar representations are compared and a gain and an offset adjustment value is determined. In one embodiment of the invention, a low and a high value of the input polar representation, Input_low and Input_high and a low and a high value of the pattern template polar representations, Pattern_low and Pattern_high, are used to determine the gain and offset values. The low value can be the minimum value, intensity value of the lowest 2% of the distribution, or other values of the polar representation. The high value can be the maximum value, intensity value of the highest 98% of the distribution, or other values of the polar representation.

In one embodiment of the invention, the low value difference is calculated as the offset value. That is:

Offset=Pattern_low−Input_low

In another embodiment, the offset values can be a function of the low value difference:

Offset=$F$(Pattern_low−Input_low)

Where $F(.)$ is a function that is positively correlated with its input.

In one embodiment of the invention, the gain can be determined by the following rule:

Gain=(Pattern_high−Pattern_low)/(Input_high−Input_low)

After the gain and offset values are determined, the input polar representation can be compensated for the gain and offset difference to yield an intensity normalized representation. In one embodiment of the invention, the gain and offset compensation for each point $(r, \theta)$ of the input polar representation can be performed by the following rule:

Out$(r,\theta)$=In$(r,\theta)$*Gain+Offset

Those skilled in the art should recognize that other intensity normalization methods such as histogram equalization can be used to normalize the input data to match the intensity distributions of the input and the template patterns.

IV.3.2 Scale and Rotation Compensation

The scale and rotation compensation step operates on the two dimensional polar coordinate transformed image. The transformed input image is scaled to 1/s* to compensate for the scale factor determined in the scale search step. In one embodiment of the invention, the scale factor compensation can be achieved by linear interpolation. Those skilled in the art should recognize that other methods of scaling adjustment could also be used.

The scaled polar coordinate representation is adjusted to match the two dimensional polar coordinate transformed image of the pattern template at the angle offset value a* determined in the rotation search step.

IV.3.3 Match Score Determination

In one embodiment of the invention, a cross correlation method is used for match score calculation. The match score can be calculated by the following rule:

$$\text{Match\_Score}(Input[i][j], Pattern[i][j]) = \sum_{i=1,j=1}^{L,W} Input[i][j] * Pattern[i][j]$$

To reduce the computational complexity for a large match region, a fast correlation method can be used. The method first scans through the pixels in the pattern region to generate a weighted histogram. For each template pixel in the pattern region, the weighted histogram count of its pixel value is incremented by an amount equal to the corresponding pixel intensity value of the input region in the input image. In one embodiment of the invention, the weighted histogram generation process can be implemented by the following pseudo code:

```
For( i = 0; i < L; i++)
    For (j = 0; j <W; j++)
    {
        Histogram[Pattern[i][j]] += Input[i][j];
    }
For (k = min_grey; k ≤ max_grey; k++)
    Matchscore += Histogram[k]*k;
```

Where
  min_grey is the minimum intensity level and
  max_grey is the maximum intensity level in the input image.

The above pseudo code assumes that the histogram counts and Matchscore are initialized to zero. The cross correlation match score is simply the weighted sum of the resulting histogram. Since there is most likely only a limited number of different grayscale intensity values for pixels within a given pattern region, the grayscale values of interest can be pre-determined and organized to efficiently compute the weighted sum value of the resulting histogram.

In another embodiment of the invention, a normalized correlation method is used for match score calculation. The match score could be calculated by the following rule:

$$\text{Match\_Score}(Input[i][j], Pattern[i][j]) = \frac{\mu(Input * Pattern) - \mu(Input)\mu(Pattern)}{\sigma(Pattern) * \sigma(Input)}$$

Where $$\mu(Input * Pattern) = \frac{1}{L*W} \sum_{i=1,j=1}^{L,W} Input[i][j] * Pattern[i][j]$$

$$\mu(Input) = \frac{1}{L*W} \sum_{i=1,j=1}^{L,W} Input[i][j],$$

$$\mu(Pattern) = \frac{1}{L*W} \sum_{i=1,j=1}^{L,W} Pattern[i][j],$$

$$\sigma(Input) = \sqrt{\mu(Input^2) - \mu(Input)^2}$$

$$\sigma(Pattern) = \sqrt{\mu(Pattern^2) - \mu(Pattern)^2}$$

$$\sigma(Input^2) = \frac{1}{L*W} \sum_{i=1,j=1}^{L,W} Input[i][j]^2, \text{ and}$$

-continued $$\mu(Pattern^2) = \frac{1}{L*W} \sum_{i=1,j=1}^{L,W} Pattern[i][j]^2.$$

To reduce the computational complexity for large match regions, a histogram based approach can be used for fast normalized correlation calculation. Note that the pattern mean and standard deviation, $\mu(Pattern), \sigma(Pattern)$, can be calculated globally and do not have to be recalculated for each correlation step.

During each correlation step, two histograms can be created, a weighted histogram as previously described and an additional histogram for the pixel intensity value of the input region. In one embodiment of the invention, the weighted histogram and input region histogram generation process can be implemented by the following pseudo code:

For (i=0; I<L; I++)

For (j=0; j<W; j++)

```
{
Histogram_w[Pattern[i][j]] += Input[i][j];
Histogram_R[Input[i][j]]++;
}
```

The above pseudo code assumes that both histogram counts are initialized to zero. The mean cross-correlation value, $\mu(Input*Pattern)$, is the mean of Histogram_w. The mean input value, $\mu(Input)$, and mean input square value, $\mu(Input^2)$, can be calculated directly as the mean value of Histogram_R and mean of square value of Histogram_R that can be efficiently calculated from the histogram counts.

Those skilled in the art should recognize that including a calculation of the match score of the inverse images can augment this match score calculation method. In this case, the match score calculation is the same, but is performed on the intensity-inverted images. To create the inverse images, the intensity of each pixel is simply intensity-inverted, which means the new value is the maximum possible intensity minus the old value. The final match score can be computed as the minimum of the normal match score and the inverse image match score. This method serves to disqualify images that match well by high intensity regions and do not match well by low intensity regions. There are several speed optimizations that apply in this method:

1) For images that do not match well by the normal match score, it is not necessary to calculate the inverse image match score, since the normal match score may immediately disqualify them.
2) Given that the two images have already been intensity normalized for the normal match score, it is not necessary to normalize the intensity again after inverting their intensities.
3) The mean of the Input and the mean of the Pattern can be easily calculated as the maximum possible intensity minus the mean of the non-inverted images.
4) The standard deviations of the intensity distributions for the images do not change due to intensity inversion.

Other methods such as the ones disclosed in U.S. patent application Ser. No. 09/834,817 entitled, "Automatic Template Generation and Searching Method" by Seho Oh et. al., filed Apr. 12, 2001 which is incorporated in its entirety herein can also be used as the matching function.

IV.3.4 Scale and Rotation Update

Figure 10:
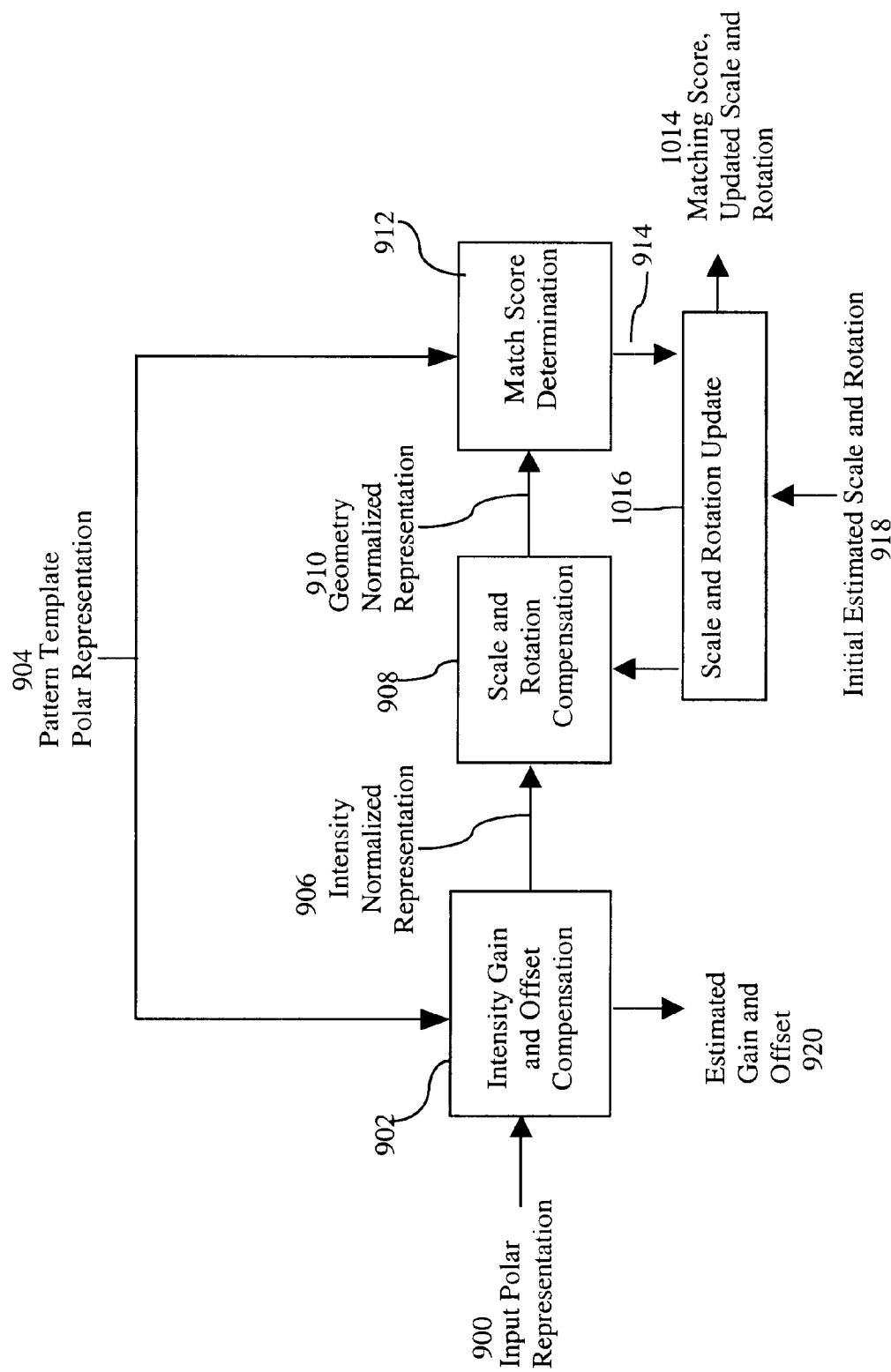
FIG. 10 shows the processing flow of the match scoring method including the update of the matching parameters.

The scale search and rotation search steps described in IV.1 and IV.2 determine the initial estimate of scale and rotation difference 918 between the input image region and the pattern templates. The estimates are based on one-dimensional searches that select from a family of possibilities that may only include approximate values of scale and rotation. This optional scale and rotation update step 1016 (FIG. 10) updates the initial estimates using the two dimensional polar coordinate transformed images and the initial estimated values. A set of scale values S within a range around the initially estimated scale factor s* is determined. Similarly, a set of rotation values R within a range around the initially estimated angle value a* is determined. The ranges depend on the expected error of the initial estimate and the accuracy requirement of the final result.

Let S be the set of input image scale possibilities and R be the set of input image rotation possibilities. For each scale factor s' within S, the transformed input image is scaled to 1/s' to compensate for the scale factor difference. The scaled polar coordinate representation is matched with the two dimensional polar coordinate transformed image of the pattern template at different angle offsets within R. The match score for a scale factor s' is the maximum match score among the different angle offsets. The angle offset associated with this maximum match score is the angle offset corresponding to scale factor s'. That is, $$\text{Match\_score}(s') = \mathop{\text{MAX}}_{a' \in R} \text{Match\_score}(s', a')$$

And a' is the angle offset corresponding to s'.

The updated match score MS is the maximum match score among the scales s within S. That is:

$$MS = \mathop{\text{MAX}}_{s \in S} \text{Match\_score}(s, a'')$$

The scale s" yielding the maximum match score is the updated scale factor. Its corresponding angle offset a" is the updated angle offset.

To reduce the computational requirement of the scale and rotation update step, a coarse to fine search method could be used that searches for optimal scale and angle using a coarse resolution representation of the input image and refines the result using the highest resolution representation.

V. Rotation and Scale Invariant Template Search

Figure 11:
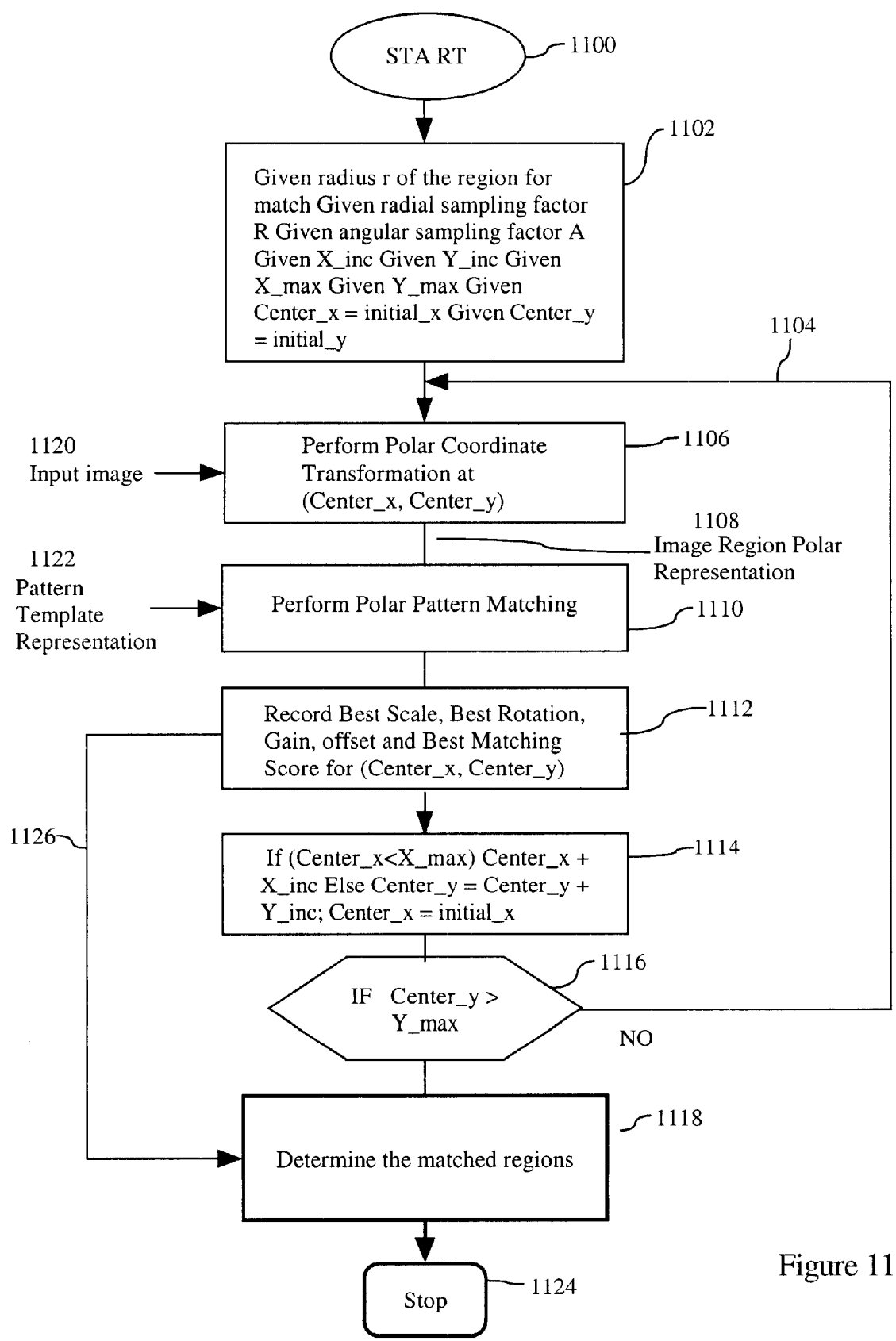
FIG. 11 shows the processing flow of an embodiment of the rotation and scale invariant template search method.

The rotation and scale invariant template search method searches through regions of an input image to find the image regions that match a pattern template. In one embodiment of the invention, the rotation and scale invariant template search method includes the steps shown in FIG. 11. Regions within the input image are matched to the pattern template representation starting from a region centered at (initial_x, initial_y). The search limits and initial conditions are initialized 1102. It scans through the image in both X direction (with X_inc increment per search step) and Y direction (with Y_inc increment per line). The scanning could cover all potential candidate regions of the input image in an exhaustive search approach. Other search methods include image preprocessing to detect the regions where potential patterns are located and then search only regions around each of the detection candidate regions.

For each candidate region in the input image 1120, the process performs polar coordinate transformation 1106 and polar pattern matching 1110 as described in the previous sections. The match results 1112 such as best scale, best rotation, gain, offset and best match score for each region are recorded. Working by a systematic process including steps and loops such as 1114, 1116, 1104, all candidate regions within the input image are scored. The matched regions are determined by a matched region determination step 1118. In applications where only one occurrence of the pattern is expected in the input image, the matched region could be determined as the one with the highest match score. For applications where multiple occurrences of the patterns are expected, all regions with high enough match scores can be detected as matched regions. Those skilled in the art should recognize that other means of matched region selection could be used. For example, a combination of match score, and match scale and rotation angle enables the selection in favor of the pattern that is at a similar geometric state as the pattern template.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A rotation and scale invariant pattern matching method comprising the steps of:
    a) inputting a learning image;
    b) inputting a pattern template specification;
    c) performing a pattern template transformation having a pattern template representation output, wherein the pattern template transformation further comprises
        i. performing a polar coordinate transformation having a polar representation output;
        ii. performing a post processing step on the polar representation having at least one profile output, wherein the post processing step further comprises the steps of:
            1. performing angular post processing having at least one angular profile output;
            2. performing a radial post processing having at least one radial profile output;
    d) inputting at least one new image;
    e) performing polar pattern matching between the pattern template representation and the new image;
    f) outputting matched pattern information.

2. The method of claim 1 wherein the radial post processing includes data interpolation.

3. The method of claim 1 wherein the radial post processing includes data scaling.

4. A polar pattern matching method comprising the steps of:
    a) inputting a pattern template polar representation;
    b) inputting an input image region polar representation;
    c) performing a scale search having an estimated scale output;
    d) performing a rotation search having an estimated rotation output;
    e) performing a match scoring having a match score output, wherein the match scoring step further comprises the steps of:
        i. performing a scale and rotation compensation having a geometry normalized representation output;
        ii. performing a match score determination using the intensity normalized representation and the geometry normalized representation having a match score output.

5. The method of claim 4 wherein the match scoring step further comprises an intensity gain and offset compensation step having an intensity normalized representation output.

6. A fast correlation method comprising the steps of:
    a) inputting a first image region;
    b) inputting a second image region;
    c) generating a weighted histogram of the first region weighted by the second region having a weighted histogram output, wherein the weighted histogram output is generated by incrementing the histogram count corresponding to the pixel intensity value of the first region by an amount equal to the intensity value of the corresponding pixel in the second image region;
    d) generating a weighted sum of the elements of the weighted histogram output and outputting the weighted sum as the correlation score.

* * * * *